(12) United States Patent
Henneken et al.

(10) Patent No.: US 6,205,388 B1
(45) Date of Patent: Mar. 20, 2001

(54) PROCESS TO EVALUATE START-UP FOR AN AUTOMATIC GEARBOX

(75) Inventors: Markus Henneken, Kressbronn; Wolfgang Schmid, Langenargen; Marko Poljansek, Reutlingen, all of (DE)

(73) Assignee: Zf Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/171,895

(22) PCT Filed: May 7, 1997

(86) PCT No.: PCT/EP97/02319
§ 371 Date: Oct. 28, 1998
§ 102(e) Date: Oct. 28, 1998

(87) PCT Pub. No.: WO97/43569
PCT Pub. Date: Nov. 20, 1997

(30) Foreign Application Priority Data

May 10, 1996 (DE) .............................................. 196 18 811

(51) Int. Cl.⁷ .................................................. B60K 41/04
(52) U.S. Cl. ................................................ 701/51; 701/55
(58) Field of Search .................................. 701/51, 55, 56, 701/58, 59, 60

(56) References Cited

U.S. PATENT DOCUMENTS

| | | | |
|---|---|---|---|
| 5,035,160 | 7/1991 | Morita ..................................... | 74/866 |
| 5,089,963 * | 2/1992 | Takahashi ............................... | 706/23 |
| 5,157,609 | 10/1992 | Stehle et al. ......................... | 364/424.1 |
| 5,251,512 * | 10/1993 | Koenig et al. ......................... | 477/120 |
| 5,396,420 * | 3/1995 | Graf ....................................... | 701/55 |
| 5,514,051 | 5/1996 | Heid et al. ............................ | 477/120 |
| 5,646,842 | 7/1997 | Schulz et al. ....................... | 364/424.08 |
| 5,771,171 * | 6/1998 | Tazawa ................................... | 701/51 |
| 5,812,957 * | 9/1998 | Iizuka ..................................... | 701/58 |

FOREIGN PATENT DOCUMENTS

| | | |
|---|---|---|
| 39 22 051 A1 | 1/1991 | (DE) . |
| 39 22 051 C2 | 1/1991 | (DE) . |
| 41 36 613 C2 | 5/1993 | (DE) . |
| 42 40 762 A1 | 6/1993 | (DE) . |
| 43 12 717 A1 | 11/1993 | (DE) . |
| 0 707 162 A2 | 4/1996 | (EP) . |

\* cited by examiner

*Primary Examiner*—Michael J. Zanelli
*Assistant Examiner*—Eric M Gibson
(74) *Attorney, Agent, or Firm*—Davis and Bujold

(57) ABSTRACT

The invention relates to a process to evaluate start-up for an automatic vehicle gearbox, said process having the following steps: 1) a signal associated with an engine torque (M__M) or an engine speed (n__M) is emitted from an engine control device (27), and a signal associated with a torque (M__T) or a speed (n__T) of the turbine shaft (18) is emitted at the electronic gear control unit (11) by a measuring device (24) on a turbine shaft (18) of a converter (2) of the automatic gearbox (1); 2) the electronic gearbox control unit (11) determines a maximum value (Max) from time-related differences (DIFF(t)) between the engine torque (M__M) and the torque (M__T) of the turbine shaft (18) or the difference (DIFF(t)) between the engine speed (n__M) and the speed (n__T) of the turbine shaft (18); 3) a gear-change characteristic (SL) characterising a particular start-up style by comparing a theoretical driver-type value (FT__Soll_n) associated with the maximum (Max) with an actual driver-type value (FT__Ist) and the setting of a counter (39) is determined on the basis of the maximum value (Max) of the differences (DIFF(t)), said gear-change characteristic being meant to emit control signals to the hydraulic gearbox control unit (10).

8 Claims, 5 Drawing Sheets

PROCESS TO EVALUATE START-UP FOR AN AUTOMATIC GEARBOX

The invention relates to a process to evaluate a start-up in the automatic gearbox of a vehicle by means of an electronic gear control device having a calculation unit, a microcontroller, a memory device and a control device for control of a hydraulic gear control device.

BACKGROUND OF THE INVENTION

So-called "intelligent" gear-change programs for electro-hydraulically controlled automatic transmissions of passenger cars are known.

Such an intelligent gear-change program has been described for example, in DE-OS 39 22 051 wherein by "intelligent" is understood that the driver of a vehicle not have to actuate any selector button for adjusting a certain gear-change range, as for example, for sport driving or economic driving, since on the basis of input variables an electronic gear control device infers the driver's behavior and thus the type of driver. As input signals serve, for example, the signal of a throttle valve, the speed of an internal combustion engine and the longitudinal and transverse acceleration determined from the wheel speeds. According to the prior art, a driving activity or a driver type is determined from input variables. Based on the driver type a corresponding gear-change characteristic is selected from a plurality of gear-change characteristics. Thus, for example, a gear-change characteristic having low gear-change points is selected for a steady driver type and for a sport driver type is selected a gear-change characteristic having high gear-change points.

Since the driver's driving behavior can be different in different driving situations, an otherwise sporting driver who nevertheless prefers slower start-ups, would in this driving situation find inconvenient a general classification of his driving behavior as sporting. The gear-change program must therefore be capable of flexibly reacting to different driving situations.

German Patent 41 36 613 has disclosed a process relative to a start-up in which the throttle valve change is observed during the start-up. Said throttle valve change is compared with a preset throttle valve range, said comparison leading to the selection of an adequate category of driving style.

But this process known from the prior art has the disadvantage that the evaluation of the start-up with reference to the throttle valve change, which does not reproduce the actual behavior of a vehicle, is subject to errors.

Therefore, this invention is based on the problem of providing a process which improves the above cited prior art with regard to a slight defectiveness in the evaluation of a start-up in comparison with the actual behavior of the vehicle.

SUMMARY OF THE INVENTION

The invention offers the advantage that by using the torque or the speeds actually delivered by the internal combustion engine, a better adaptation to the vehicle behavior is achieved.

Another advantage of the invention consists in that by using the counter a driver's driving behavior and driving style are to a great extent taken into consideration.

BRIEF DESCRIPTION OF THE DRAWING(S)

Other advantages of the invention the description of the invention that follows and has reference to the fundamental drawing in which.

DESCRIPTION OF THE PREFERRED EMBODIMENT(S)

Figure 1:
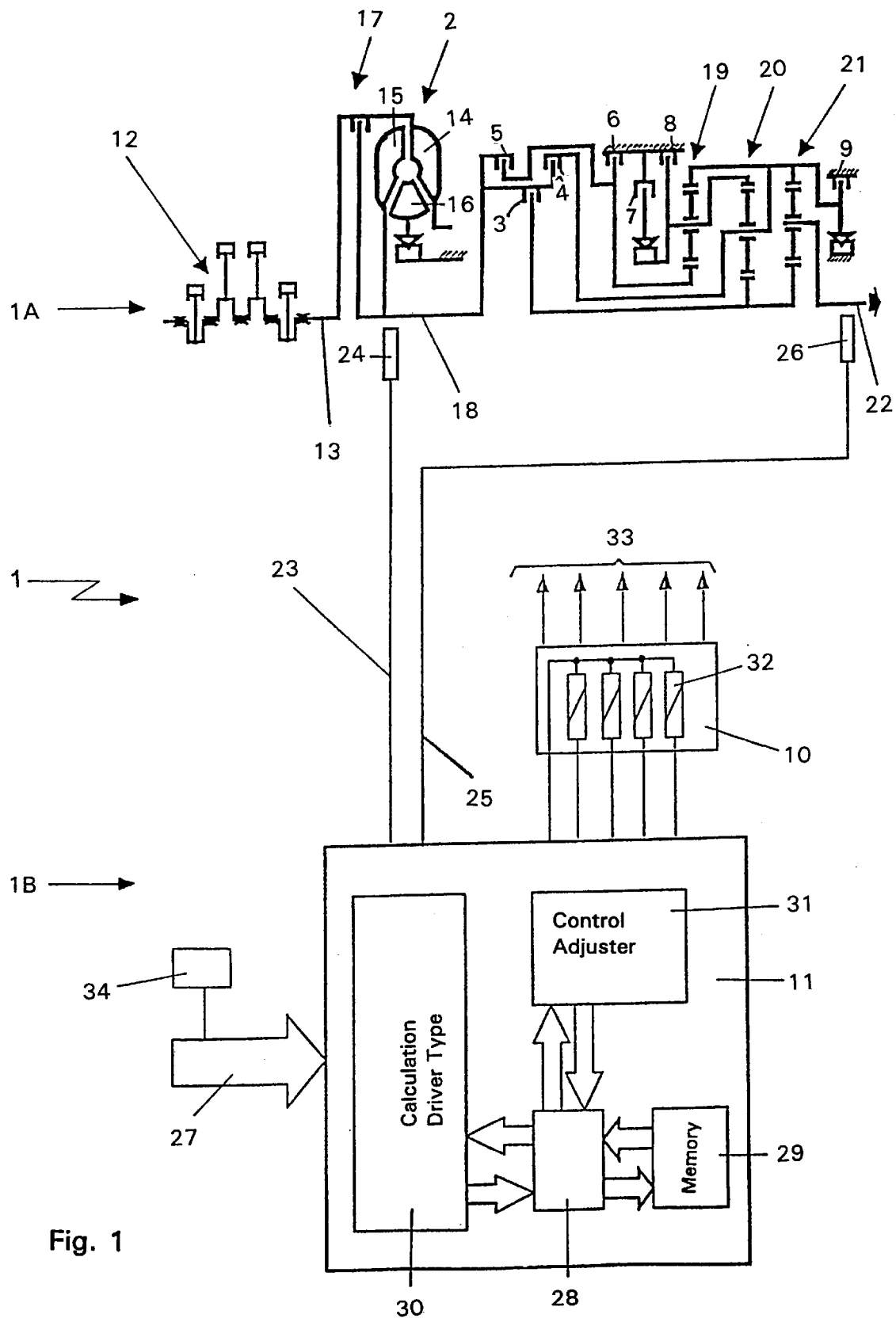
FIG. 1 shows an extensively schematized system diagram of an automatic transmission.

Referring to FIG. 1, it shows an extensively schematized system diagram of an automatic transmission 1. The automatic transmission 1 consists of one mechanical part 1A having a hydrodynamic converter 2 and switching components 3 to 9 designed as clutches or brakes and one control part 1B having one hydraulic device 10 and one electronic control device 11. The automatic transmission 1 is driven via an input shaft 13 by an input unit 12 which is conveniently designed as an internal combustion engine. The input shaft 13 is non-rotatably connected with an impeller 14 of the hydrodynamic converter 2, which in addition has a turbine wheel 15 and a stator 16. Parallel to the hydrodynamic converter 2 is situated a converter clutch 17. The converter clutch 17 and the turbine wheel 15 lead to a turbine shaft 18, said turbine shaft 18 having, when the converter clutch 17 is actuated, the same speed as the input shaft 13. In addition to the hydrodynamic converter 2 and the clutches and brakes 3 to 9, the mechanical part 1A of the automatic transmission 1 has two free wheels not designated in detail and three consecutively disposed planetary gear sets 19, 20 and 21. In the automatic transmission 1 as output is designed a transmission output shaft 22 which leads to a differential not shown which drives via two axle half shafts—also not shown—input gears of the vehicle. A gear step is selected by an appropriate clutch/brake combination. Since the components of the automatic transmission 1 described have no added significance for further understanding of the invention, they will not be discussed in detail at this point.

From the mechanical part 1A of the automatic transmission 1 to the electronic control device 11 pass a line 23 for transmitting a turbine speed signal which is produced by a measuring device 24 from the turbine shaft 18 and a line 25 for transmitting from the transmission output shaft 22 a transmission output speed signal generated by a measuring device 26. Together with the transmission output speed signal and the turbine speed signal, there are transmitted from the internal combustion engine 12 symbolically indicated in FIG. 1, added input variables such as the position of a throttle valve, the torque $M\_M$ produced by the internal combustion engine 12, the speed $n\_M$ of the internal combustion engine 12, the temperature of the engine and of the hydraulic fluid of the automatic transmission 1, the wheel speeds $n\_Rad$, which are determined from the wheel-speed measuring device 34. In accordance with said input variables the electronic control device 11 selects via the hydraulic control device 10, an adequate gear step.

The electronic control device 11 which in FIG. 1 is shown extensively schematized has for this purpose a microcontroller 28, a memory device 29, a calculation unit 30 for determining the driver type and a control device 31. In the memory device 29, which is conveniently designed as an EProm, EEProm, or buffered RAM, are deposited the relevant transmission data to which belong, for example, programs and data, the same as diagnosis data. The control device 31 serves to control automatically the adjusters 32 situated in the hydraulic control device 10 which are provided for pressurizing the clutches and brakes 3 to 9, as symbolically indicated by the arrow 33 in FIG. 1.

Figure 2:
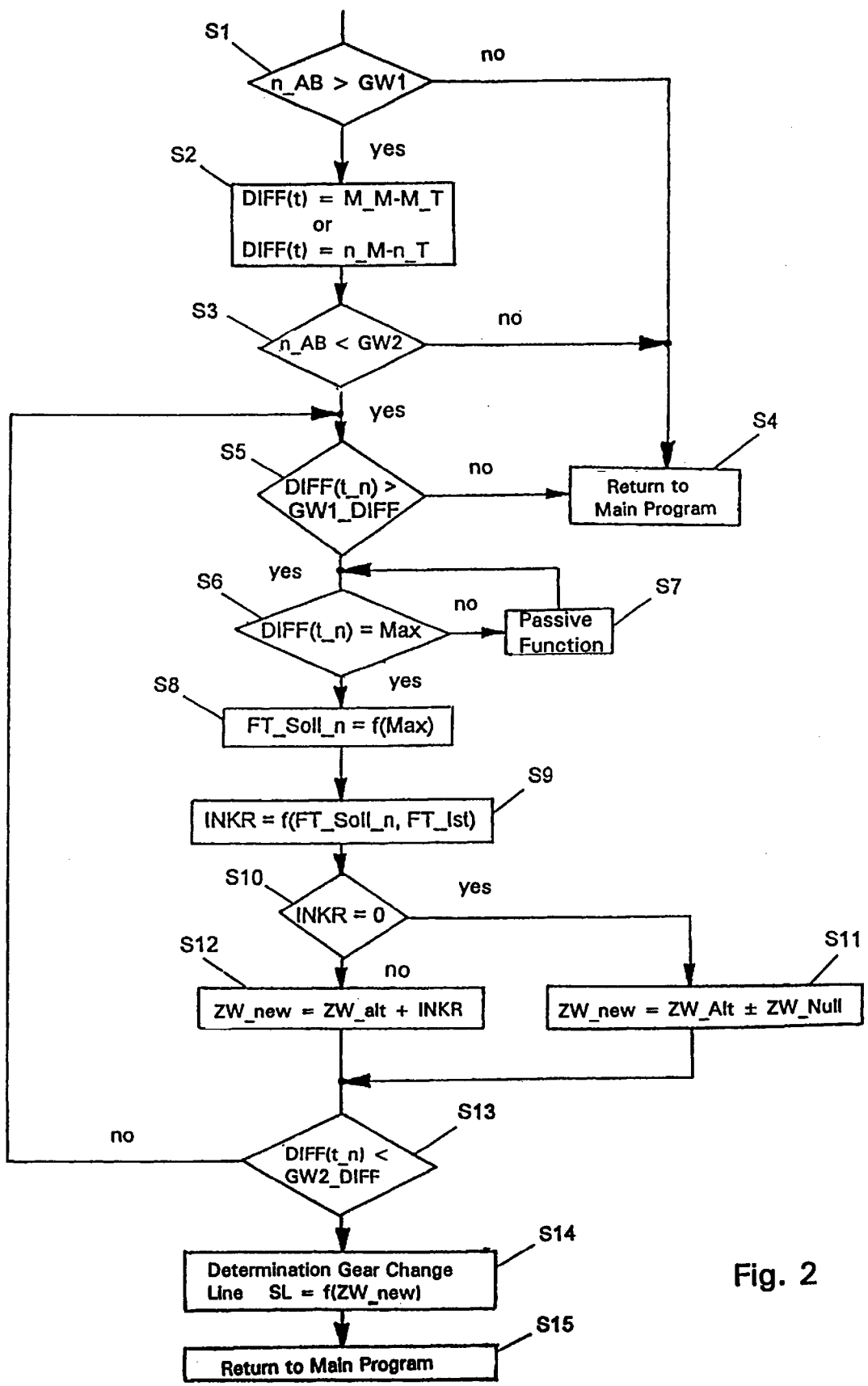
FIG. 2 shows a program flow chart for evaluation of a cornering.

Referring to FIG. 2, it shows a program sequence for a subprogram to evaluate a start-up.

At the beginning is tested in a first differentiation function S1 whether a transmission output speed n_AB determined on the transmission output shaft 22 is higher than a preset first limit value GW1. In case the output speed n_AB is lower than or equal to the first limit value GW1, a first processing function S4 for return to the main program is activated. If the transmission output speed n_AB is higher than the first limit value GW1, a first calculation function S2 is activated for calculating a time-related different DIFF(t) between the engine torque M_M and the torque M_T of the turbine shaft 18 or the difference DIFF(t) between the engine speed n_M and the speed n_T of the turbine shaft 18. To this end the actual engine torque M_M generated by the internal combustion engine is transmitted by the engine control device 27 to the electronic transmission control device 11, or it is calculated, in the calculation unit 30 of the electronic transmission control device 11, from the engine speed n_M and an injection time t_ein. The torque M_T on the turbine shaft 18 can, on one hand, be directly measured or, on the other, be calculated from the engine torque M_M actually generated by the internal combustion engine and a start-up conversion of the hydrodynamic converter 2. The speed n_T and the torque M_T on the turbine shaft are issued via corresponding signals directly by the measuring device 24 to the turbine shaft 18 on the electronic transmission control device 11.

In a second differentiation function S3 is tested whether the transmission output speed n_AB determined on the transmission output shaft 22 is lower than a preset second limit value GW2. If this is not the case, then a branching to the processing function S4 takes place for return to the main program. In case of positive inquiry result, that is, that the transmission output speed n_AB is lower than the second limit value GW2, third differentiation function S5 is activated to establish whether a calculated difference DIFF(t_n) is higher than a preset first difference limit value GW1_DIFF. DIFF(t_n) means here the measured difference DIFF(t) at the n point of time. If the result of the inquiry is negative, the program branches for return to the main program to the processing function S4. If the result of the inquiry is positive, that is, that the difference DIFF(t_n) is higher than the first difference limit value GW1_DIFF, another differentiation function DIFF(t_n) is begun in which is established whether the difference DIFF(t_n) is a maximum value Max. If this is not the case, the program branches to the first passive function S7 and a passive loop is run through until the fourth differentiation function S6 detects a difference DIFF(t_n) as maximum value Max. When the present difference DIFF(t_n) represents a maximum value Max, to the latter is associated in a second processing function S8 an overall theoretical driver type value FT_Soll_n from several driver value theoretical types FT_Soll.

Figure 5:
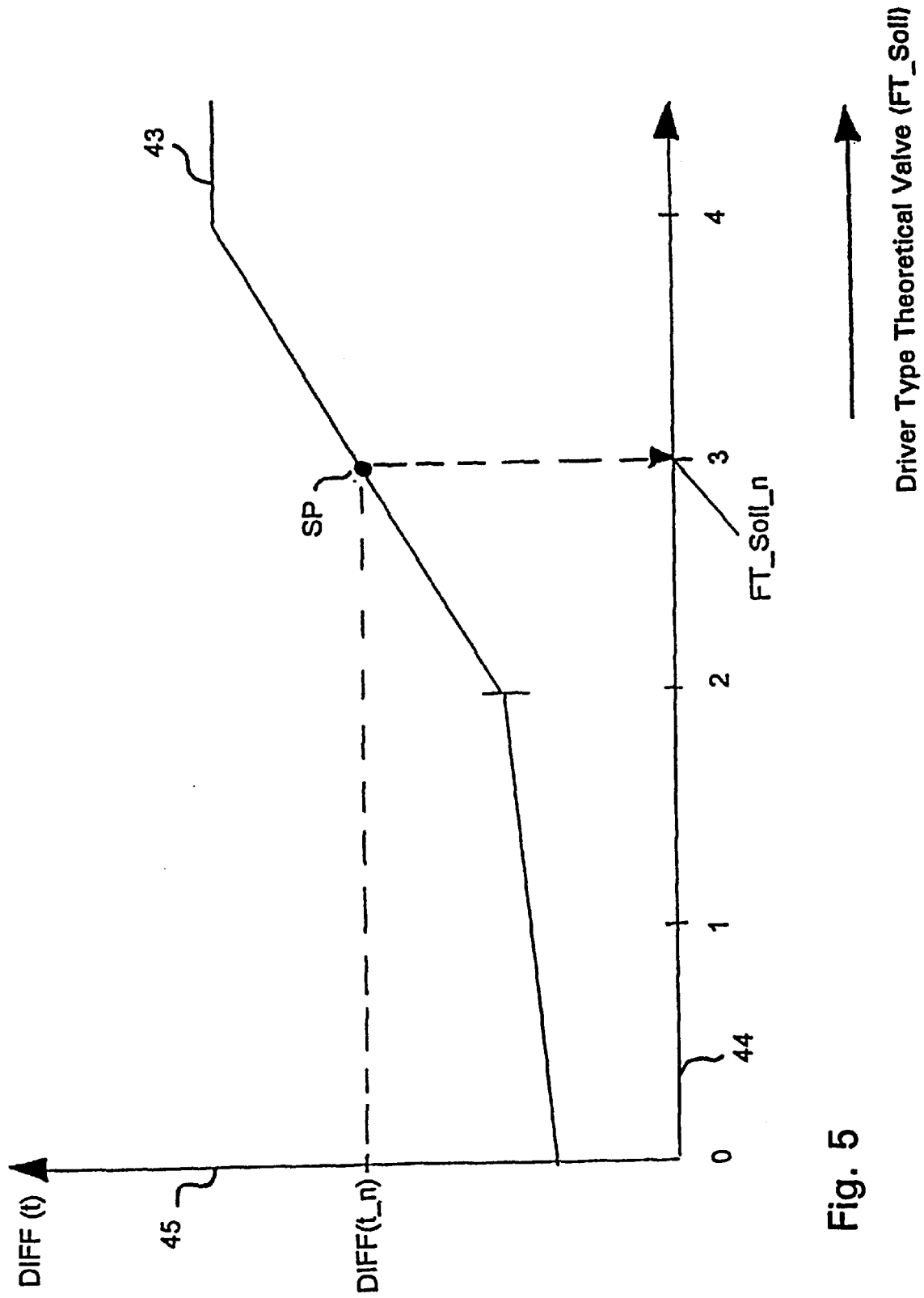
FIG. 5 shows a coordinate system to determine a driver-type theoretical value from a different DIFF(t) according to FIG. 2.

Said association results by means of a relationship between the differences DIFF(t) and the theoretical driver-type values FT_Soll determining characteristic line 43, which is shown in FIG. 5.

FIG. 5 shows a coordinate system with an abscissa 44 upon which the several theoretical driver-types value FT_Soll is plotted and an ordinate 45 upon which the time-related difference DIFF(t) is plotted. The characteristic line 43 represents an association of the difference value with the driver-type theoretical value. It can be graphically examined with reference to FIG. 5 that the association has been shown in such a manner that a difference DIFF(t_n) over the characteristic line 43 with an intersection point SP has been associated with a driver-type theoretical value FT_Soll_n.

The driver-type theoretical value FT_Soll_n second processing function S8 is issued to third processing function S9 which determines an increment INKR between the driver-type theoretical value FT_Soll_n and the driver-type actual value FT_Ist.

Figure 3:
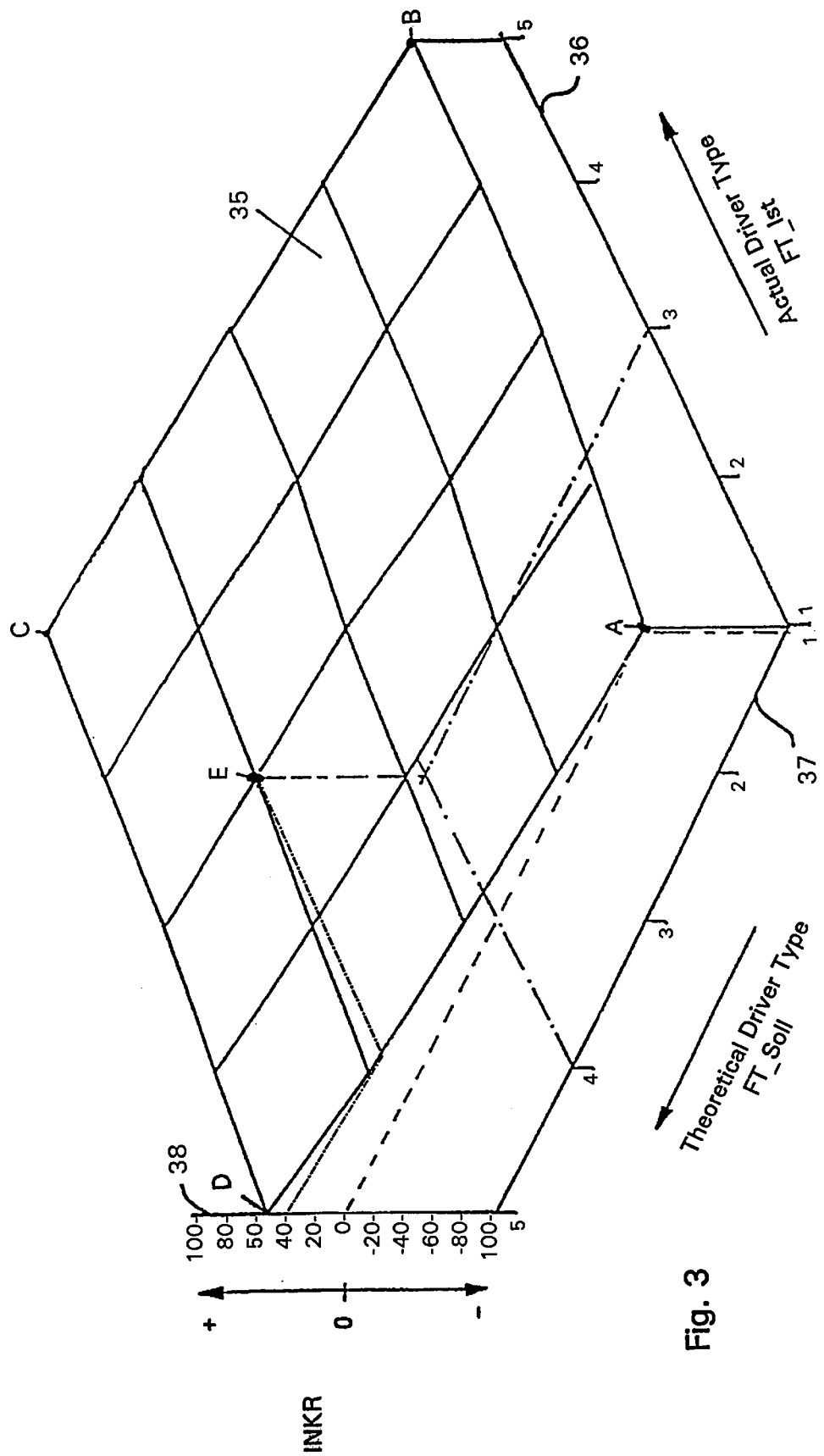
FIG. 3 shows a performance graph for determining an increment (INKR)

Referring to FIG. 3, it shows a preset performance graph 35 which determines the relationship between the theoretical driver-type values FT_Soll, the driver-type actual value FT_Ist and the increment INKR and serves for determining the increment INKR in the processing function S9. The driver-type actual value FT_Ist is here plotted on a first axis 36, the theoretical driver-type values FT_Soll on a second axis 37 and the increment INKR on a third axis 38. In the performance graph 35 is a surface with the terminal points A, B, C and D.

To determine the increment INKR, the driver-type theoretical value FT_Soll_n is first recorded, and the driver-type actual value FT_Ist is determined. The appertaining increment INKR on the axis 38 results from the intersection point of said two values in the performance graph 35.

In FIG. 3 can be seen two examples for determining an increment, the first example being shown with hatched lines and the second example with dash-and-dot lines.

In the first example the theoretical driver-type values FT_Soll is determined with the value one and the driver-type actual value FT_Ist is likewise determined with the value one. As intersection point results the join A with which is associated the increment value zero.

In the second example are plotted a theoretical driver-type values FT_Soll of four and a driver-type actual value FT_Ist of three. Therefrom results in the performance graph 35 an intersection point E with which is associated on the axis 38 the increment value 40.

In a fifth differentiation function S10 which can be seen in FIG. 2 is tested whether the increment INKR is equal to the zero value.

Figure 4:
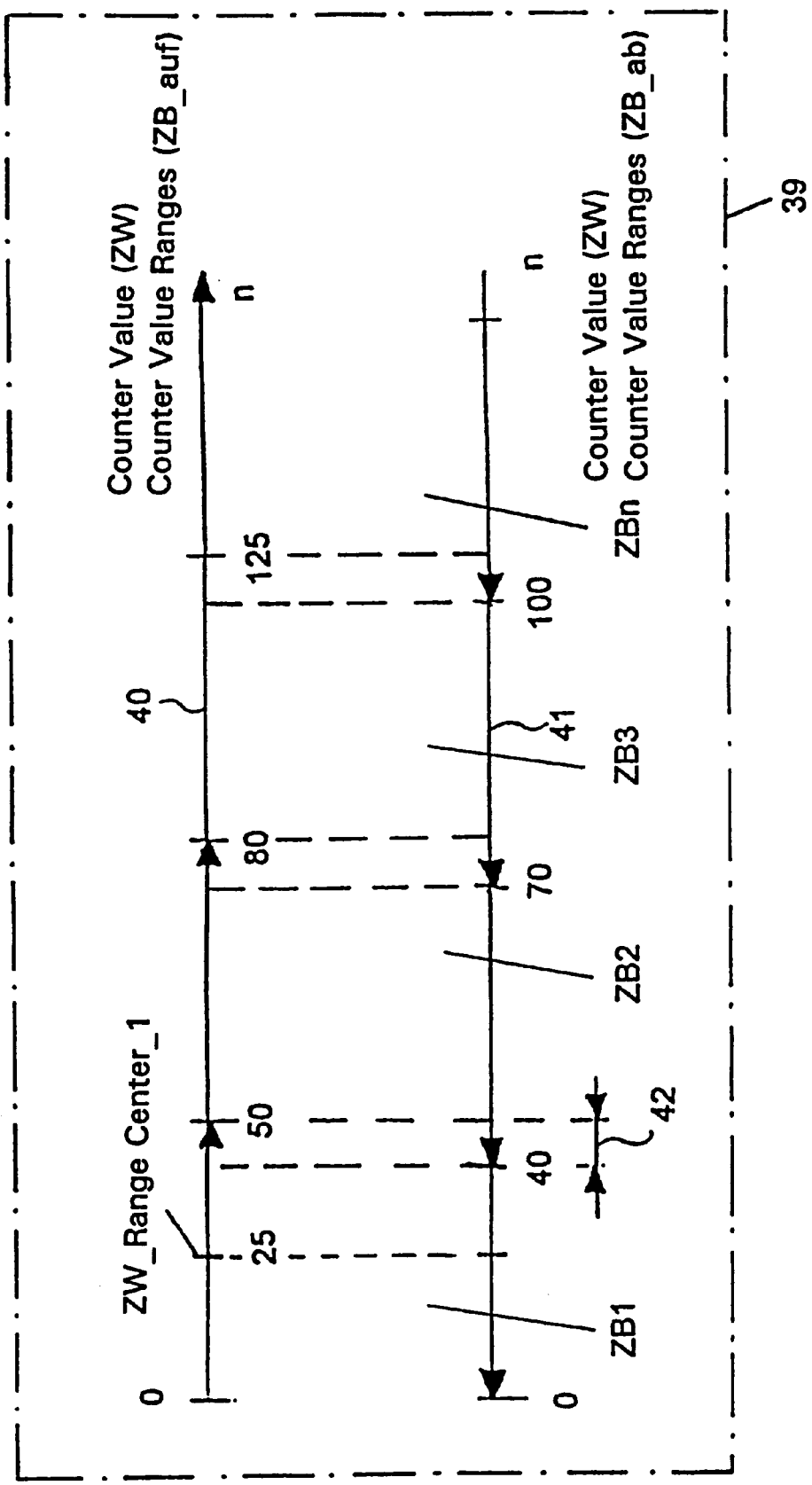
FIG. 4 shows a schematized representation of a counter.

According to the result delivered by the fifth differentiation function S10, is adjusted a counter 39 shown in FIG. 4 with counter values ZW which are sub-divided in defined, counter value ranges ZB associated with a certain driver type or start-up style. The counter 39 has a high counter 40 and a low counter 41 which are symbolically shown as numeric unlimited lines extending parallel to each other. The high counter 40 begins with the value zero and continuously rises up to a counter value ZW of n and the low counter 41 extending in opposite direction begins with the counter value of n and descends continuously down to the counter value of zero. The intervals between the counter values ZW are identical in the high counter 40 and the low counter 41 so that the counter values of the high counter 40 and of the low counter 41 overlap. The counter values are divided in n-counter value ranges, the intervals of a counter value range ZB_auf in the high counter 40 and that of a counter value range ZB_ab in the low counter 41 coinciding. But the counter value ranges ZB_auf and ZB_ab are offset relative to each other by a certain number of counter values ZW, ten counter values in the example of FIG. 4. The first counter value range ZB_auf_1 of the high counter 40 begins with the counter state zero according to FIG. 4 and ends in the counter value 50. The second counter value range ZB_auf_2 of the high counter 40 begins at the counter value 50 and ends at the counter value 80. In the instant example the counter value range ZB_ab_1 of the low counter 41 begins with the counter value 40 and ends at the count zero. The second counter value range ZB_ab_2 of the low counter 41 begins at the counter value 70 and ends at the counter value 40. The counter value ranges ZB_auf, ZB_ab represent sportive steps of a driver type or driving behavior wherein with rising number of counter value range ZB_auf or ZB_ab the sportiveness of the movement of a vehicle is rated higher. Between two correlating counter value ranges ZB_auf_n and ZB_ab_n there result in the limit ranges overlapping zones due to the offset relative to each other of the counter value ranges ZB_auf and ZB_ab. The width of an overlapping zone 42 corresponds to the counter value interval by which the counter value ranges are offset relative to each other, that is, the overlapping zone 42 in the example of FIG. 4 has a width of ten counter values. The overlapping zones 42 represent here stabilization zones.

If the differentiation function S10 of FIG. 2 delivers the result that the increment INKR equals zero, that is, that the theoretical driver-type values FT_Soll and the driver-type actual value FT_Ist are identical, in a third processing function S11 is determined the new counter value according to the equation ZW_Neu=ZW_Aft±ZW_Null. This means that the counter ZW_Neu has been passed to the range center, the sign of the term ZW_Null showing therefrom whether the old counter value ZW_Alt is higher or lower than the range center.

For this is plotted in FIG. 4 by way of example a counter value ZW_range center of the counter value range ZB_auf_1 or ZB_ab_1, the counter value of which amounts to 25.

If the differentiation function S10 delivers the result that the increment is higher or lower than zero, that is, that the theoretical driver-type values FT_Soll and the driver-type actual value FT_Ist differ from each other, in a fourth processing function S12 is determined a term of a sum from a preceding counter value ZW_Alt and the increment INKR as new counter value ZW_Neu and the counter 39 is set accordingly.

In the second example shown in FIG. 3 the increment value amounts to 50, that is, the counter value is increased by the amount of 50.

According to the driving situation, the counter 39 is thus directly increased or decreased without filtration, or in case of conformity of driver-type actual value FT_Ist and theoretical driver-type values FT_Soll, it is set in the center of a counter value range.

In a sixth differentiation function of S13 is tested whether the difference DIFF(t_n) is lower than a second difference limit value GW2_DIFF. If this is not the case, the program rebounds to the third differentiation function S5 where is tested whether the difference DIFF(t_n) is higher than the first difference value GW1_DIFF.

In case of a positive result of the inquiry of the sixth differentiation function S13, in a fifth processing function S14 is associated with the new counter value ZW_Neu a gear change characteristic SL from a plurality of gear change characteristics each of which is adequate for a certain type of driver or start-up style.

Since a sporting driver, who in a traffic light, for example, accelerates intensively producing a high torque or speed difference, the electronic transmission control device 11 can thus select with high or low gearshift points the gear change characteristic best suited to the type of driver. Thereafter the program is returned to via a sixth processing function S15.

What is claimed is:

1. A process for evaluating start-up in an automatic transmission of a vehicle via an electronic transmission control device having a calculation unit, a micro-controller, a memory device and a control device for controlling a hydraulic transmission control device, the process comprising the steps of:

issuing a signal associated with engine torque (M_M) and engine speed (n_M), from an engine control device (27) to the electronic control device (11), and issuing, a signal associated with one of a torque (M_T) and a speed (n_T) of a turbine shaft (18) from a measuring device (24) at the turbine shaft (18) of a converter (2) of the automatic transmission (1);

determining, via the electronic transmission control device (11), a maximum value (Max) of a time-related difference (DIFF(t)) between one of (a) the engine torque (M_M) and the torque (M_T) of the turbine shaft (18), and (b) the engine speed (n_M) and the speed (n_T) of the turbine shaft (18);

assigning an overall theoretical driver-type value (FT_Soll n) to the maximum value (Max) of the difference (DIFF(t));

comparing the overall theoretical driver-type value (FT_Soll_n) to an actual driver-type value (FT_Ist) and adjusting a counter (39); and determining from the counter (39) a specific gear change operating characteristic curve (SL) that characterizes a certain start-up style and issuing a control signal to the hydraulic transmission control device (10).

2. The process according to claim 1, further comprising the steps of:

determining the maximum value (Max) of the difference (DIFF(t)) so that a first differentiation function (S1) is activated to establish whether a transmission output speed (n_AB) determined at a transmission output shaft (22) is higher than a preset first limit value (GW1);

performing one of: (a) activating a first processing function (S4) for returning to a main program if the transmission output speed (n_AB) is one of equal to and lower than the first limit value (GW1), and (b) activating a first calculation function (S2) to calculate the difference (DIFF(t)) if the transmission output speed (n_AB) is higher than the first limit value (GW1);

activating a second differentiation function (S3) establishing whether the transmission output speed (n_AB), determined at the transmission output shaft (22), is higher than a preset second limit value (GW2);

performing one of: (c) activating the first processing function (S4) to return to the main program if the transmission output speed (n_AB) is one of equal to and higher than the second limit value (GW2), and (d) activating a third differentiation function (S5) to establish whether a calculated difference (DIFF(t_n)) is higher than a preset first difference limit value (GW1_DIFF) if the transmission output speed (n_AB) is lower than the second limit value (GW2);

performing one of: (e) activating fourth differentiation function (S6) if the difference (DIFF(t_n)) is higher than the preset first difference limit value (GW1_DIFF), the fourth differentiation function (S6) establishing if the difference (DIFF(t_n)) is the maximum value (Max); and (f) activating the first processing function (S4) to return to the main program if the difference (DIFF(t_n) is equal to or lower than the first difference limit value (GW1_DIFF); and activating a first passive function (S7) and maintaining the first passive function (S7) until the fourth differentiation function (S6) detects the difference (DIFF(t_n)) is the maximum value (Max).

3. The process according to claim 1, further comprising the steps of determining the gear change characteristic curve (SL) from the maximum value (Max) including:

assigning the overall theoretical driver-type value (FT_Soll_n) determined from several theoretical driver-type values (FT_Soll) to the maximum value (Max) by a second processing function (S8);

supplying the overall theoretical driver-type value (FT_Soll_n) assigned by the second processing function (S8) to a third processing function (S9), the third processing function (S9) determining an increment (INKR) between the overall theoretical driver-type value (FT_Soll_n) and the actual driver-type value (FT_Ist);

issuing the increment (INKR) to a fifth differentiation function (S10), the fifth differentiation function (S10) establishing whether the increment (INKR) is equal to a value of zero;

performing one of (a) setting the counter (39), if the increment (INKR) is equal to a value of zero, at counter values (ZW) which are subdivided in defined counter value ranges (ZB_auf, ZB_ab) associated with one of a certain driver behavior and a start-up style, in a manner such that in a third processing function (S11) a new counter value (ZW_Neu) is determined according to a function ZW_Neu=ZW_Alt±ZW_Null, and (b) determining in a fourth processing function (S12), if the increment (INKR) is one of higher and lower than zero, a new counter value (ZW_Neu) from the preceding counter value (ZW_Alt) and the increment (INKR);

activating a sixth differentiation function (S13) establishing whether the difference (DIFF(t_n)) is lower than a second difference limit value (ZW2_DIFF);

performing one of: (c) associating a gear change characteristic line (SL) with the new counter value (ZW_Neu) in a fifth processing function (S14), if the difference (DIFF(t_n)) is lower than a second difference limit value (ZW2_DIFF) and activating a sixth processing function (S15) for return to the main program, and (d) again activating the third differentiation function (S5) if the difference (DIFF(t)) is one of higher than and equal to the second difference limit value (GW2_DIFF).

4. The process according to claim 3, further comprising the step of assigning the maximum value (Max) to the overall theoretical driver-type value (FT_Soll_n), in the second processing function (S8), via a characteristic line (43) that determines a relationship between the differences (DIFF(t)) and the theoretical driver-type value (FT_Soll).

5. The process according to claim 3, further comprising the steps of determining the increment (INKR) in the third processing function (S9) from a preset performance graph (35) and determining a relationship between the theoretical driver-type value (FT_Soll), the actual driver-type value (FT_Ist), and the increment (INKR).

6. The process according to claim 3, further comprising the step of establishing overlapping zones of the ranges for the counter values (ZB_auf, ZB_ab) of the counter (39).

7. The process according to claim 1, further comprising the step of calculating, in the calculation unit (30) of the electronic transmission control device (11), the engine torque (M_M) from the engine speed (n_M) and an injection period of time (t_ein).

8. The process according to claim 1, further comprising the step of calculating the torque (M_T) of the turbine shaft (18) from the engine torque (M_M) and a start-up conversion of the hydrodynamic converter (2).

* * * * *